(12) United States Patent
Silver et al.

(10) Patent No.: US 11,967,243 B2
(45) Date of Patent: *Apr. 23, 2024

(54) TOY WITH LIGHT EMITTING DIODE

(71) Applicant: Hannah Faith Silver, Longmont, CO (US)

(72) Inventors: Hannah Faith Silver, Longmont, CO (US); Jody Young Balaun, Golden, CO (US); Dawn Marie Yager, Denver, CO (US)

(73) Assignee: Hannah Faith Silver, Longmont, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/862,192

(22) Filed: Jul. 11, 2022

(65) Prior Publication Data
US 2022/0343791 A1    Oct. 27, 2022

Related U.S. Application Data

(60) Continuation of application No. 16/950,087, filed on Nov. 17, 2020, now Pat. No. 11,386,801, which is a
(Continued)

(51) Int. Cl.
*A63H 33/22* (2006.01)
*A63H 3/00* (2006.01)
(Continued)

(52) U.S. Cl.
CPC ............ *G09B 17/003* (2013.01); *A63H 3/006* (2013.01); *A63H 3/14* (2013.01); *A63H 33/22* (2013.01); *A63H 33/38* (2013.01); *G09B 5/02* (2013.01)

(58) Field of Classification Search
CPC .......... A63H 3/006; A63H 3/14; A63H 33/22; A63H 33/38; A63F 2009/2445; G09B 5/02; G09B 17/003
(Continued)

(56) References Cited

U.S. PATENT DOCUMENTS

| 1,268,622 A | 6/1918 | Reynolds |
| 3,175,226 A | 3/1965 | Weinberg |

(Continued)

OTHER PUBLICATIONS

Official Action for U.S. Appl. No. 16/163,280, dated Jun. 25, 2019 6 pages.
(Continued)

*Primary Examiner* — Kien T Nguyen
(74) *Attorney, Agent, or Firm* — Sheridan Ross P.C.

(57) ABSTRACT

A toy has one or more LED light sources positioned on the toy so the light source illuminates beyond the toy. A toy to be worn on the human finger comprises a body includes an anchoring portion for receiving or locating a finger or fingers. A LED or other light source is operated on the toy to interact with photo-luminescent ink and other inks pre-printed or included in a decoration on the surface of another item such as a book or other toy. The toy is a reading tool or a light source or an enhancement of other toys or writings. The LED light sources include a black light and/or other LED lights of other colors. The lights are connected to a circuit board and an integrated power source, which are connected to a switch encased on the toy.

20 Claims, 5 Drawing Sheets

Related U.S. Application Data continuation of application No. 16/163,280, filed on Oct. 17, 2018, now Pat. No. 10,839,711, which is a continuation of application No. 14/997,382, filed on Jan. 15, 2016, now Pat. No. 10,134,301, which is a division of application No. 14/513,796, filed on Oct. 14, 2014, now Pat. No. 9,242,185.

(60) Provisional application No. 61/944,482, filed on Feb. 25, 2014, provisional application No. 61/895,261, filed on Oct. 24, 2013.

(51) Int. Cl.
*A63H 3/14* (2006.01)
*A63H 33/38* (2006.01)
*G09B 5/02* (2006.01)
*G09B 17/00* (2006.01)

(58) Field of Classification Search
USPC ....... 446/26, 219, 175, 327, 484; 2/163, 169
See application file for complete search history.

(56) References Cited

U.S. PATENT DOCUMENTS

| | | | |
|---|---|---|---|
| 4,281,472 A | 8/1981 | Hill | |
| 6,405,167 B1 | 6/2002 | Cogllano | |
| 8,568,189 B2 | 10/2013 | Garbos et al. | |
| 9,242,185 B2 | 1/2016 | Silver et al. | |
| 10,134,301 B2 | 11/2018 | Silver et al. | |
| 10,839,711 B2 | 11/2020 | Silver et al. | |
| 11,386,801 B2 | 7/2022 | Silver et al. | |
| 2004/0062038 A1 | 4/2004 | Donovan | |
| 2006/0094327 A1 | 5/2006 | Chernick et al. | |
| 2007/0036608 A1* | 2/2007 | Jones | B43K 29/00 |
| | | | 401/195 |
| 2009/0150160 A1 | 6/2009 | Mozer | |
| 2012/0315819 A1 | 12/2012 | Gandy | |
| 2013/0102222 A1 | 4/2013 | Clark | |

OTHER PUBLICATIONS

Final Action for U.S. Appl. No. 16/163,280, dated Jan. 8, 2020 6 pages.
Notice of Allowance for U.S. Appl. No. 16/163,280, dated Jul. 15, 2020 5 pages.
Official Action for U.S. Appl. No. 16/950,087, dated Oct. 6, 2021, 9 pages.
Notice of Allowance for U.S. Appl. No. 16/950,087, dated Mar. 14, 2022, 7 pages.

* cited by examiner

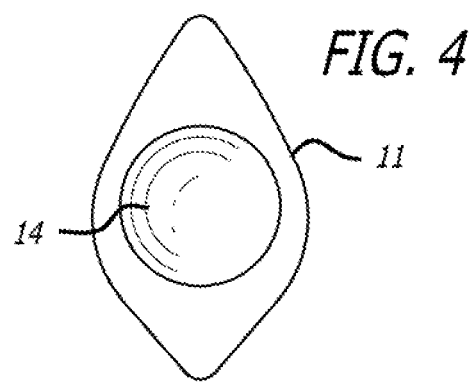
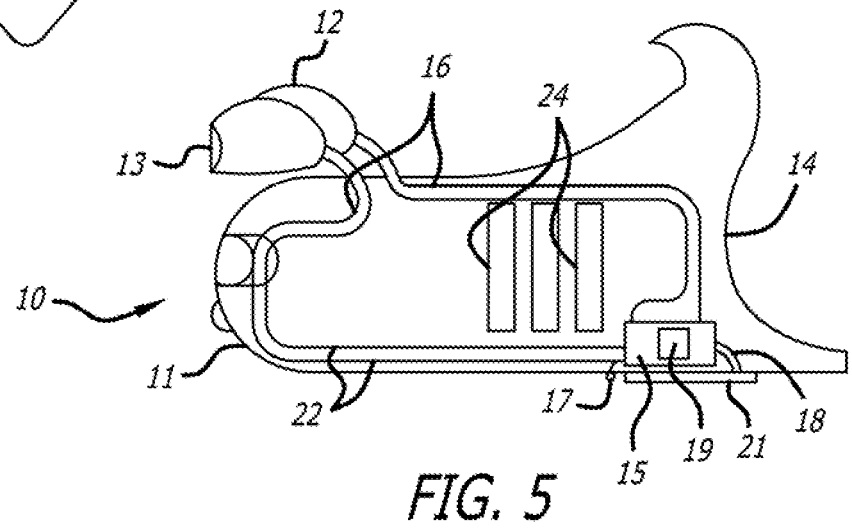
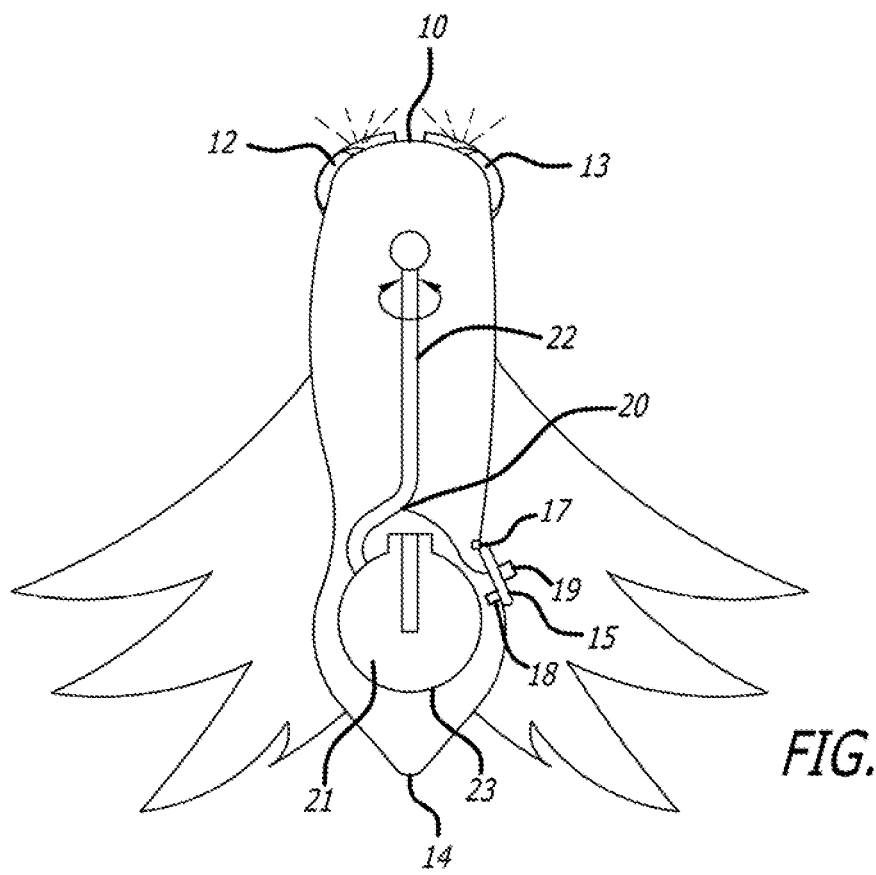

TOY WITH LIGHT EMITTING DIODE

RELATED APPLICATIONS

This U.S. Non-Provisional Patent Application is a Continuation Application and claims the benefit of priority of U.S. patent application Ser. No. 16/950,087, filed Nov. 17, 2020, issued as U.S. Pat. No. 11,386,801 on Jul. 12, 2022, which is a Continuation Application and claims the benefit and priority of U.S. patent application Ser. No. 16/163,280, filed on Oct. 17, 2018, issued as U.S. Pat. No. 10,839,711 on Nov. 17, 2020, which is a Continuation Application and claims the benefit and priority of U.S. patent application Ser. No. 14/997,382, filed Jan. 15, 2016, issued as U.S. Pat. No. 10,134,301, which is a Divisional Application and claims the benefit and priority of U.S. patent application Ser. No. 14/513,796, filed Oct. 14, 2014, issued as U.S. Pat. No. 9,242,185, which claims priority to U.S. Provisional Patent Application Ser. No. 61/944,482 filed Feb. 25, 2014, and U.S. Provisional Patent Application Ser. No. 61/895,261, filed Oct. 24, 2013, the entire disclosures of each of which are hereby incorporated by reference.

BACKGROUND

The disclosure relates to a toy with one or more LED light sources positioned on the toy so the light source illuminates beyond the toy.

SUMMARY

The toy includes at least one LED light source positioned on a body of the toy so the light source illuminates beyond the body of the toy. The LED light sources include a black light and can include other LED lights of other colors. The light sources are positioned strategically anywhere on the toy.

DRAWINGS

The above-mentioned features and objects of the present disclosure will become more apparent with reference to the following description taken in conjunction with the accompanying drawings wherein like reference numerals denote like elements and in which:

FIG. 4 is the back view of the toy.

FIG. 5 is the side view of the toy.

FIG. 6 is the bottom view of the toy.

Figure 11A:
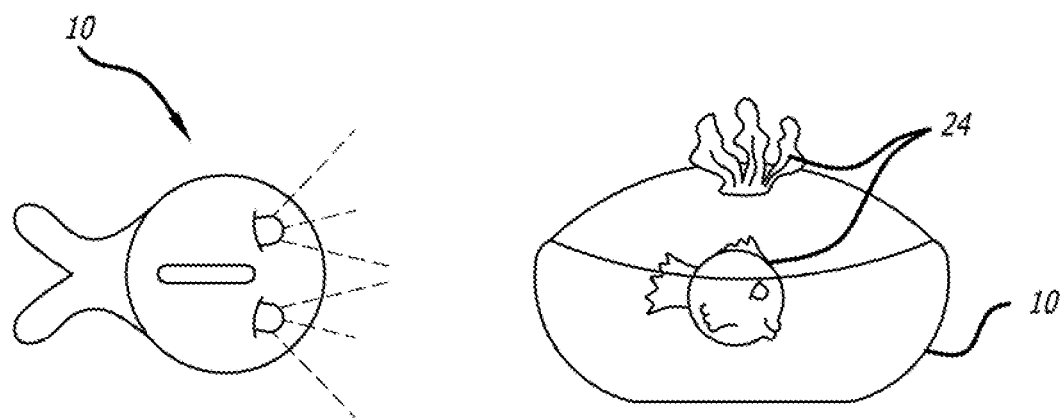
Figure 11B:
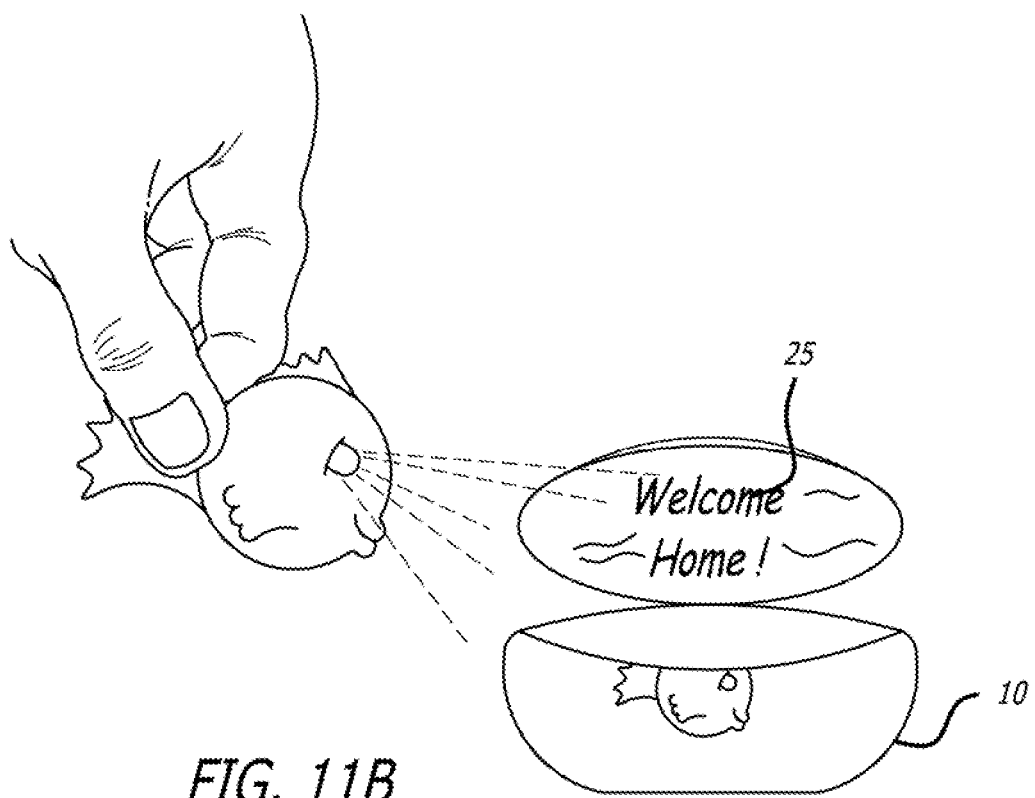

FIGS. 11A and 11B demonstrate another example of the toy interacting with luminescent ink included in a decoration on the surface of another toy.

DETAILED DESCRIPTION

A purpose of this disclosure is to allow the user to have the LED or other light source interact with photo-luminescent ink and other inks. The light source/s emits black light and/or a white light or other colored light.

A toy to be worn on the human finger comprises a body includes an anchoring portion, selectively a substantially hollow housing for receiving or locating a finger or fingers.

The present disclosure is unique because it has a black light and white or other colored lights in a finger puppet/toy. It will be both a reading tool and a light source and will enhance other toys or writings.

A puppet/toy (hereinafter toy) to be worn on the human finger having a substantially hollow housing in which a finger or fingers may be positioned. The interior of the toy is substantially hollow allowing the user to place their finger inside. The toy may be used as an extension of the finger or hand held. The interior of the body of the toy will have projections, selectively, several circumferential ribs 24 to accommodate different sized fingers.

The toy will have one or more LED light sources positioned on the toy so that the light source illuminates beyond the tip (distal end) of the finger. Light sources may be positioned elsewhere on the toy as well. The lights will be connected to a circuit board and an integrated power source, which will be connected to a switch encased in the toy. The mechanism, nature and location of LED lights, the circuit board, wiring, power source and switch are to be further defined based on the shape of the character of the toy.

The purpose of this disclosure is to allow the user to have the LED or other light source interact with photo-luminescent ink and other inks. The light source/s will emit black light and a white light or other colored light The number and location of the light source/swill be defined based on the shape and character of the toy. Photo luminescent ink and other inks will be pre-printed or included in a decoration on the surface of another item such as a book or other toy. The black and other lights in the toy will react with the ink.

It is anticipated a child will use this toy to enhance learning to read. The user would place the toy on their finger and then place the tip of the toy under each word as they learn to read. The user would use the toy as a pointer. The user would use the toy to turn pages of a book. The child would use the light to illuminate the words, either in black, white or other colored light, to make reading an interactive experience. The light from this book character puppet/toy could be used to illuminate answers to questions or solve other riddles. The toy could be a character in a book. The toy could be part of a collectible series. The surface of the toy could have a photo luminescent quality so that it glows in the presence of other toys.

The design of the toy will also have a ridge at the proximal end which will allow the toy to act as the cap of a pen, seating into a pen that holds photo luminescent ink. The pen which holds photo-luminescent ink will be applied by the user of the toy to paper or other surface. The person will then use the toy to turn on the LED black and other light. The colored ink will be illuminated by the toy to reveal the hidden writings or enhance the visible message. The toy can then be returned to cap the pen and preserve and protect the ink.

The light sources will be positioned in the toy in an integrated way to enhance the character of the toy. For example, (but not limited to), the toy could take the shape of the bug and the light sources would be located in the antennae. Another example (but not limited to) would have a toy airplane with the light sources incorporated into the wings.

A toy to be worn on the human finger comprises a body includes an anchoring portion, selectively a substantially hollow housing for receiving or locating a finger or fingers.

The anchoring portion, selectively an interior of the body includes a series of ribs, selectively circumferential ribs, to accommodate different sized fingers.

The toy can include at least one LED light source positioned on the toy so that the light source illuminates beyond the tip (distal end) of the finger.

The toy can include multiple light sources positioned on multiple positions on the toy.

The light is connected to a circuit board and an integrated power source, which will be connected to a switch encased in the toy.

The toy can include a ridge at the proximal end for the toy to act as the cap of a pen, seating into a pen.

The toy can have a white light or other colored lights in a finger puppet toy, and the toy permits for at least one of a reading tool and a light source or an enhancement of other toys or writings.

A method of using a toy comprises locating the toy on the human finger, the toy comprises a body including an anchoring portion, selectively a substantially hollow housing for receiving or locating a finger or fingers. A LED or other light source is operated on the toy to interact with photo-luminescent ink and other inks.

The light sources emits black light and a white light or other colored light, and wherein the number and location of the fight sources is defined based on the shape and character of thereto. A photo-luminescent ink and other inks are pre-printed or included in a decoration on the surface of another item such as a book or other toy.

The toy is used as a finger puppet toy, and having the toy act as a reading tool or a light source or an enhancement of other toys or writings.

Figure 1:
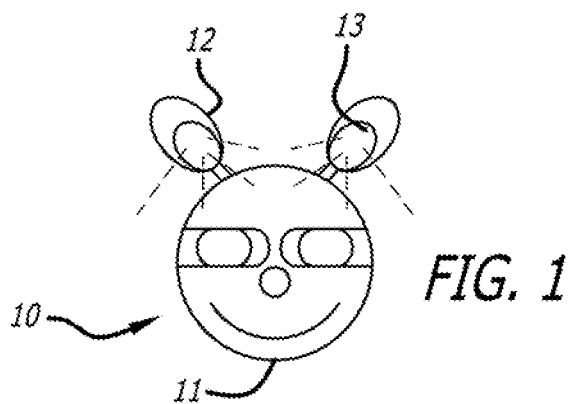
FIG. 1 shows the toy with the front of the body.

FIG. 1 of the toy as viewed from the front 10 of the body 11. FIG. 1 also shows the two LED lights 12, 13, one black light 12 and one white light 13, in the antennae of the toy. The black light 12 would be turned on to react with the ink. The white light 13 would be used for general reading.

Figure 2:
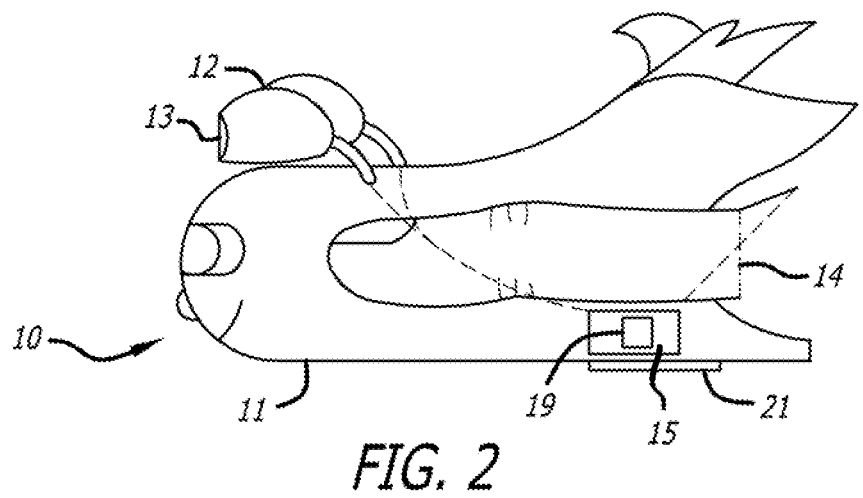
FIG. 2 is the toy viewed from one side of the body and demonstrates a switch in the body.

FIG. 2 is the toy viewed from one side of the body 11 of the toy. It demonstrates the finger placed inside the toy body 11. FIG. 2 also demonstrates where a switch 15 could be placed integrated into the toy body 11.

Figure 3:
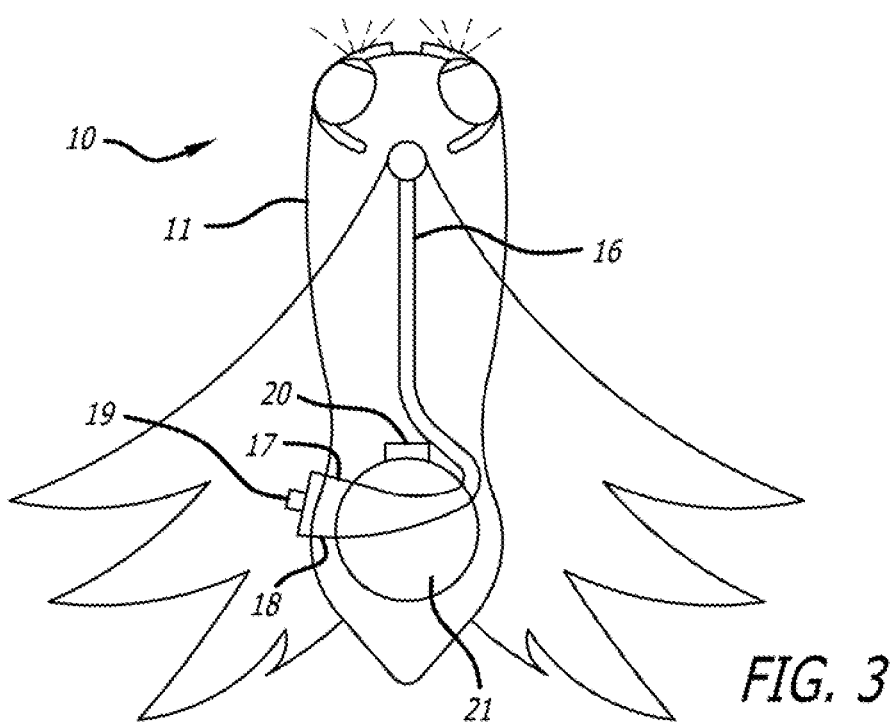
FIG. 3 is the top view of the toy.

FIG. 3 is the top view of the toy. Positive wires 16 from LED lights 12, 13 run through top of toy and connect to two on positions 17, 18 of switch 15 leading to the LED lights 12, 13, The off position 19 of switch 15 connects to the positive position 20 on battery holder 21.

FIG. 4 is the back view of the toy where the finger is inserted 14 in the toy body 11.

FIG. 5 is the side view of the toy. Negative wires 22 from LED lights 12, 13_run through the bottom of the toy body 11 and connect to the negative position 23 on battery holder 21. FIG. 6 is the bottom view of the toy. It demonstrates several circumferential ribs 24 that will accommodate different sized fingers. Both demonstrate how the wiring 16, 22 power source 21 and switch 15 would be integrated into the unit to operate the lights 12, 13. The power source, wiring and switch would be developed further, but the protected idea is the use of the black and white light in the toy.

For instance, instead of a closed body for housing the finger, there may be series of open spaced apart rings. In some cases the finger puppet is in the form of a glove fitting over more than the finger, but part of the hand as well and in some cases more than one finger has respective puppets for each respective finger.

A toy has one or more LED light sources positioned on the toy so the light source illuminates beyond the toy. The LED fight sources include a black light and may include other LED lights of other colors as well. Light sources are positioned anywhere on the toy. The lights are connected to a circuit board and an integrated power source, which are connected to a switch encased on the toy. The mechanism, number and location of LED lights, the circuit board, wiring, power source and switch are further defined based on the shape of the character of the toy.

The lights are connected to a circuit board and an integrated power source, which are connected to a switch encased on the toy. The mechanism, number and location of LED lights, the circuit board, wiring, power source and switch are to be further defined based on the shape of the character of the toy.

The lights can be integrated into character or design of the toy. For example, but not limited to, the light sources can be at the end of an imaginative shape such as magic wand, or a scepter held by a princess, or the eyes on a space creature. This toy could have attachments such as a head band (creating a head lamp) or to a clip (like a book light) which could be attached to the toy.

Photo-luminescent ink and other inks are pre-printed or included in a decoration on the surface of another item such as a book or other toy. The black and other lights in the toy react with the ink.

A child uses this toy to enhance reading materials or surfaces of other toys. The child uses the lights integrated into the toy to illuminate the words, either in black, white or other colored light, to make using the other surface an interactive experience.

The light would illuminate hidden images., answers to questions, or solve other riddles. The toy reveals hidden designs on the surface of other toys which is connected with it, to make the toy fun to play with in low light environments.

Figure 7:
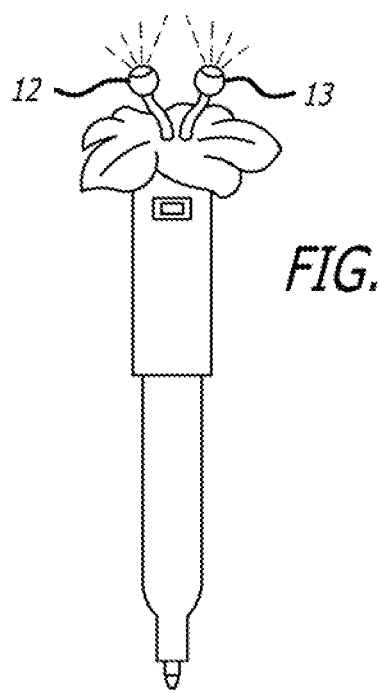
FIG. 7 is the exterior of a different design for the toy.

In addition, as shown in FIG. 7, the toy 10 could be connected to or encase a pen 26 which holds photo luminescent ink, The pen which holds photo-luminescent ink is used to write a message on paper or other surface. The photo luminescent ink is hidden to normal vision and is illuminated by the toy to reveal the hidden writings or enhance the visible message.

The toy 10, 22 shows two LED lights 11, 12, one black-light, 11 and one white light 12 on the front 23 of the toy body 10. The black-light 11 would be turned on to react with the photo-luminescent ink 25. The white light 12 would be used with standard ink 24 for general reading.

Positive wires 16 from the LED lights 12, 13 run through the top of the toy body 11 and connect with two on positions 17, 18 of switch 15 leading to the LED lights 12, 13. The off position 19 of switch 15 connects to the positive position 20 on battery holder 21, Negative wires 22 from LED lights 12, 13 run through the bottom of the toy body 11 and connect to the negative position 23 on battery holder 21.

Figure 8:
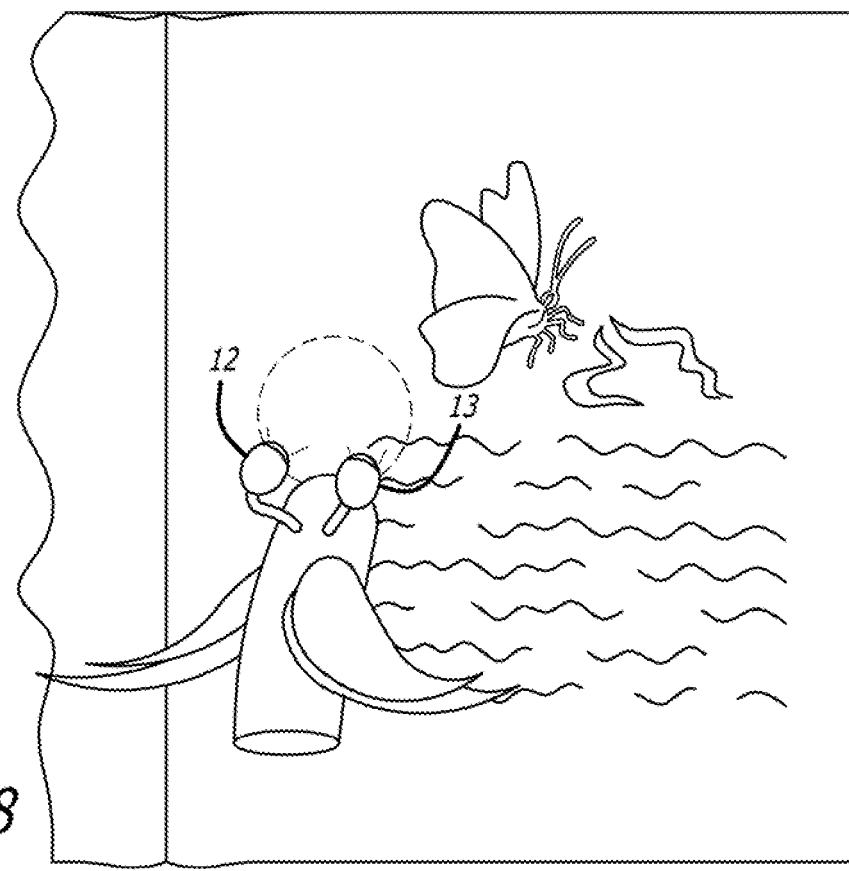
FIG. 8 shows the toy lighting up a book with white light.
Figure 9:
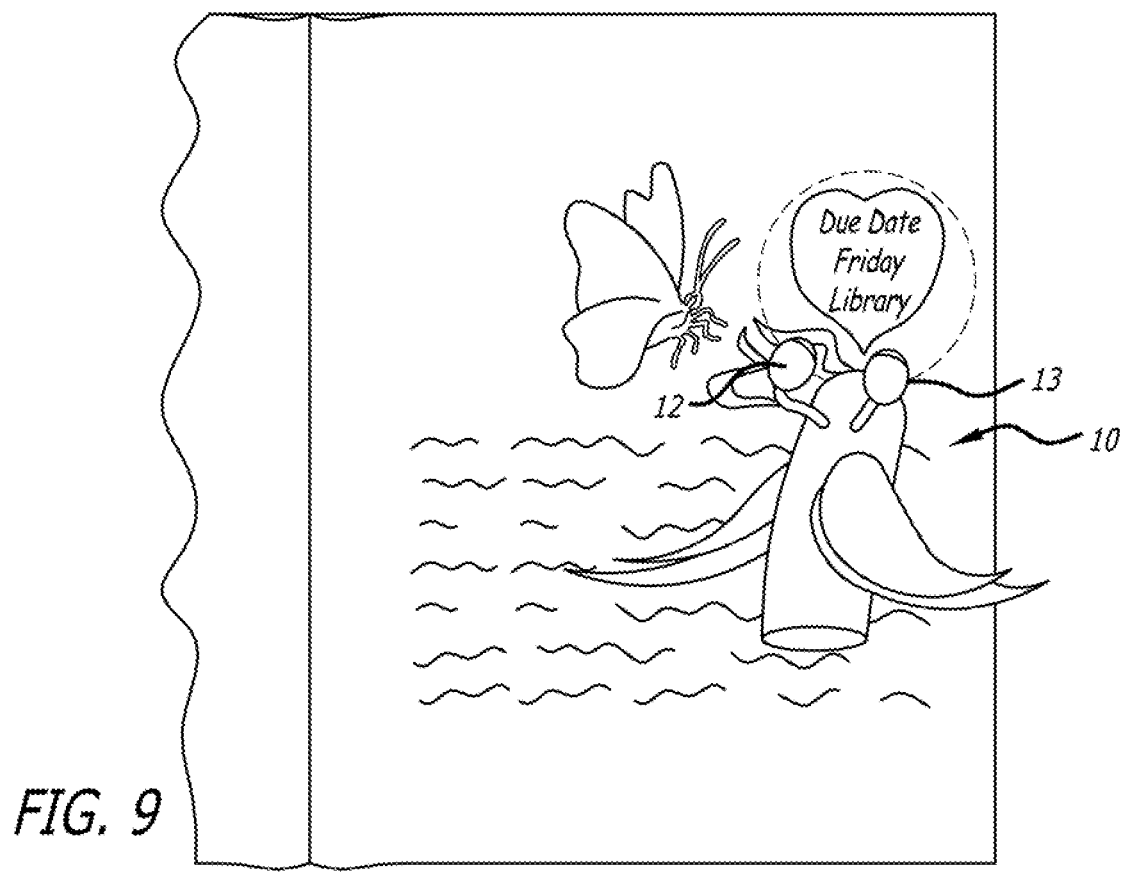
FIG. 9 shows the toy lighting up photo-luminescent ink on the book.
Figure 10:
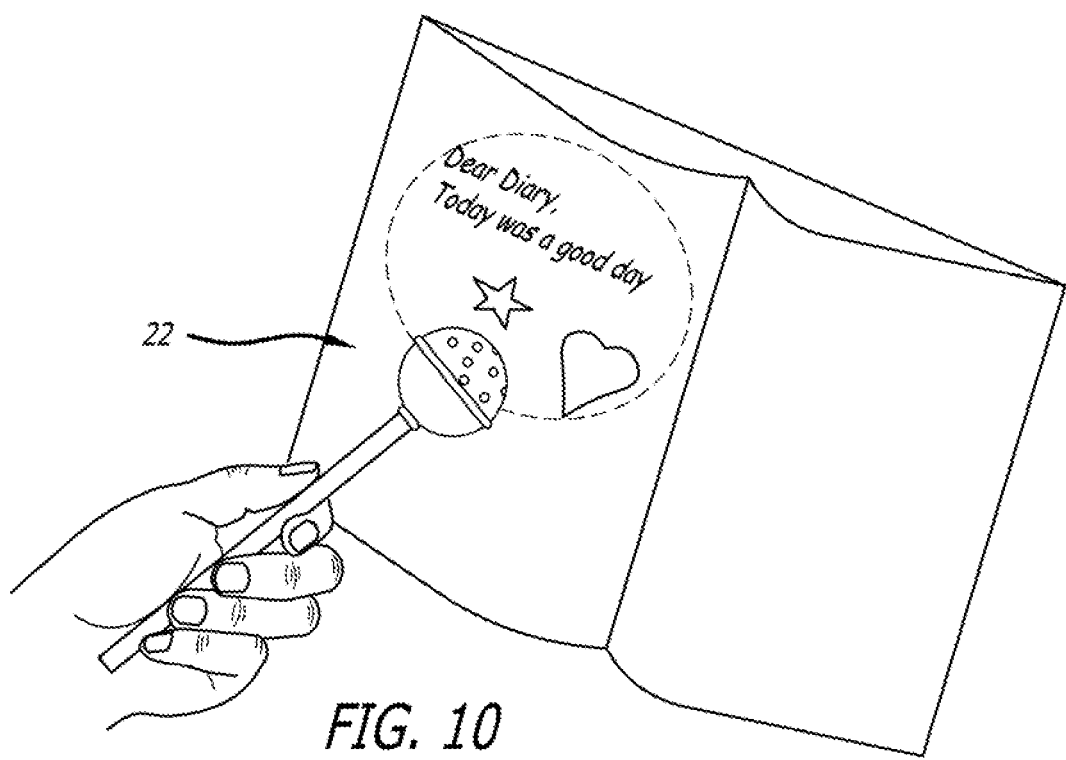
FIG. 10 is a demonstration of the toy as it relates to the interaction with a book or magazine.

FIGS. 8, 9 and 10 are a demonstration of the toy 10, 22 as it relates to the interaction with a book, magazine etc., with standard ink 24 and/or photo luminescent ink 25.

FIGS. 11A and 11B demonstrate another example of the toy 10 interacting with the photo-luminescent ink 25 and/or standard inks 24 preprinted or included in a decoration on the surface of another toy.

The present disclosure is unique because it has a black light and white light concealed in the toy, which interacts with books or other toys with photo luminescent ink.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A toy to be interacted with by a user, the toy comprising:
a body including an anchoring portion;
a substantially hollow housing defined within the body for receiving at least a portion of a hand of the user, wherein the at least a portion of the hand is insertable via an opening within an exterior surface of the body;
at least one light source operable to illuminate a surface beyond the body; and
a switch integrated into the body.

2. The toy of claim 1, wherein the at least a portion of the hand is a finger, wherein the toy is operable to be worn on the finger via insertion of the finger into the opening, wherein the opening is positioned at a proximal end of the body, and wherein the at least one light source is operable to illuminate a surface beyond a distal end of the body.

3. The toy of claim 2, further comprising:
a battery connected to the switch and the at least one light source, wherein the battery is positioned within the body proximate to the finger when the finger is inserted into the substantially hollow housing.

4. The toy of claim 3, wherein the light source and the switch are connected to the battery and a circuit board via wiring, and wherein the wiling is routed within the body proximate to the substantially hollow housing.

5. The toy of claim 1, wherein the at least one light source comprises an LED light source at a first location and a blacklight spaced apart from the LED light source and at a second location.

6. The toy of claim 5, wherein the LED light source is capable of illuminating an ink printed on a reading material, and wherein the blacklight is capable of reacting with a photo-luminescent ink printed on the reading material.

7. A toy to be worn on a finger, the toy comprising:
a body including an anchoring portion;
a substantially hollow housing defined within the body for receiving the finger, wherein the finger is insertable via an opening within an exterior surface of the body;
at least one light source operable to illuminate a surface beyond a tip of the body; and
a switch integrated into the body proximate to the substantially hollow housing.

8. The toy of claim 7, wherein the at least one light source comprises two or more light sources that are spaced apart a predetermined distance on the toy, wherein the two or more light sources are selectively activated by a user.

9. The toy of claim 7, the anchoring portion comprising a plurality of ribs located on an interior surface of the body that are operable to accommodate different sized fingers.

10. The toy of claim 9, wherein the different sized fingers are configured to pass through at least some of the plurality of ribs.

11. A reading tool system, comprising:
a toy configured to be worn on a finger, the toy comprising:
a body including an anchoring portion;
a substantially hollow housing defined within the body for receiving the finger, wherein the finger is insertable via an opening within an exterior surface of the body;
at least one light source operable to illuminate a surface beyond the body; and
a switch encased in the body; and
a reading material capable of being interacted with by the at least one light source of the toy.

12. The reading tool system of claim 11, wherein the at least one light source comprises a plurality of LED light sources configured to output illumination in at least one color.

13. The reading tool system of claim 11, wherein the at least one light source comprises a blacklight, wherein the reading material is printed with a photo-luminescent ink, wherein the blacklight is operable to react with the photo-luminescent ink, and wherein the photo-luminescent ink is printed on the reading material as one or more of an image, text, or a design that is selectively visible on the reading material with the blacklight.

14. The reading tool system of claim 11, wherein a shape of the body corresponds to a character or design depicted in the reading material.

15. The reading tool system of claim 14, wherein a positioning of the at least one light source corresponds to the positioning of at least one physical feature or a shape of the character or design, and wherein the at least one physical feature is embedded within, positioning on, or extending from an outer surface of the body.

16. The reading tool system of claim 11, wherein the toy has a photo-luminescent exterior surface.

17. The reading tool system of claim 11, further comprising:
a writing instrument, wherein the toy is couplable to the writing instrument when the finger is not inserted into the substantially hollow housing, and wherein the toy includes at least one engaging feature operable to couple to the writing instrument.

18. The reading tool system of claim 17, wherein the at least one engaging feature is within the opening of the toy.

19. The reading tool system of claim 17, wherein the writing instrument includes photo-luminescent ink.

20. The reading tool system of claim 11, further comprising:
a second toy having a surface printed with a photo-luminescent ink; wherein the photo-luminescent ink is printed on the second toy as one or more of an image, text, or a design that is selectively visible on the second toy with a blacklight of the at least one light source.

* * * * *